Jan. 17, 1939. R. S. KOONCE 2,144,600
METHOD OF AND APPARATUS FOR LOADING HEAVY SPOOLS
Filed Nov. 3, 1938 2 Sheets-Sheet 2
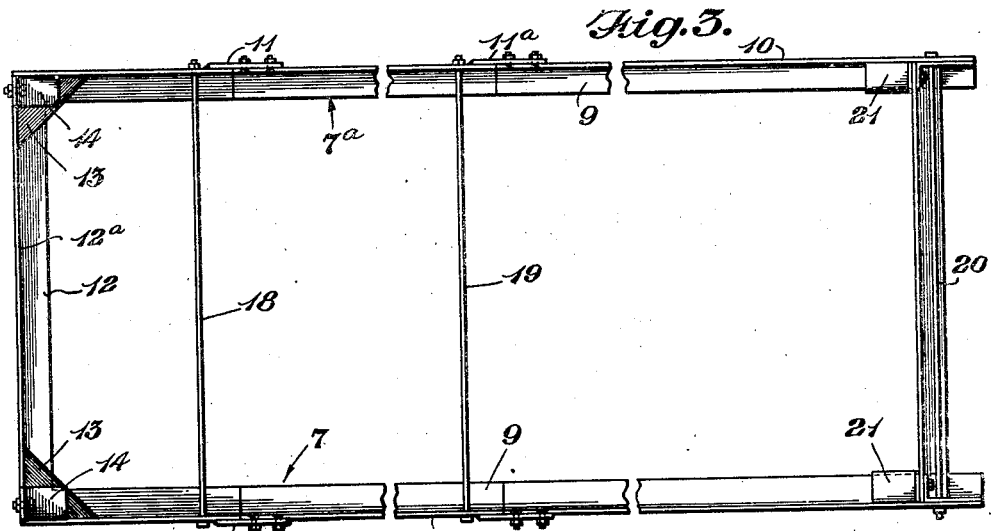
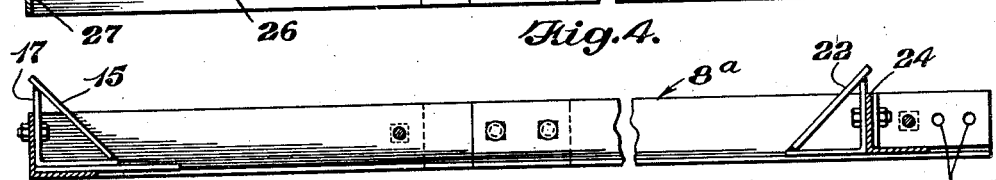
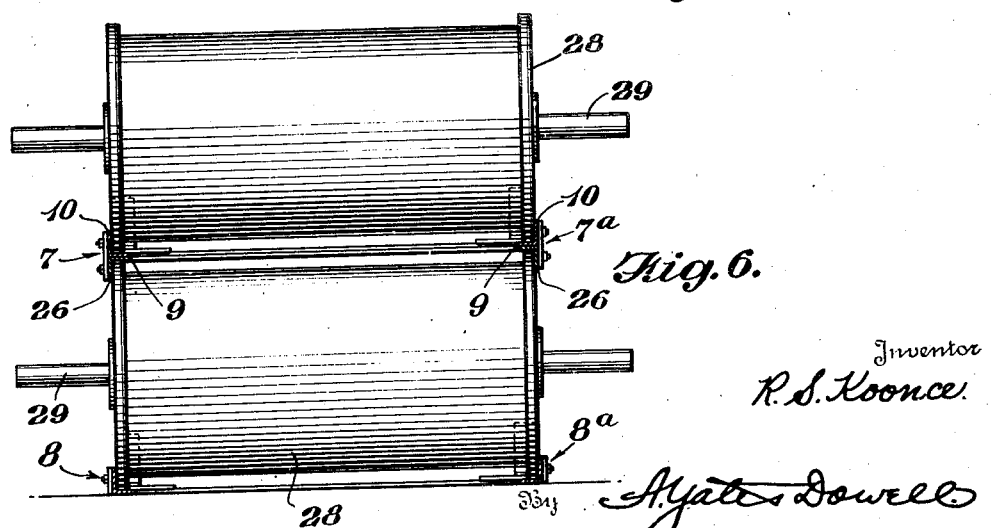

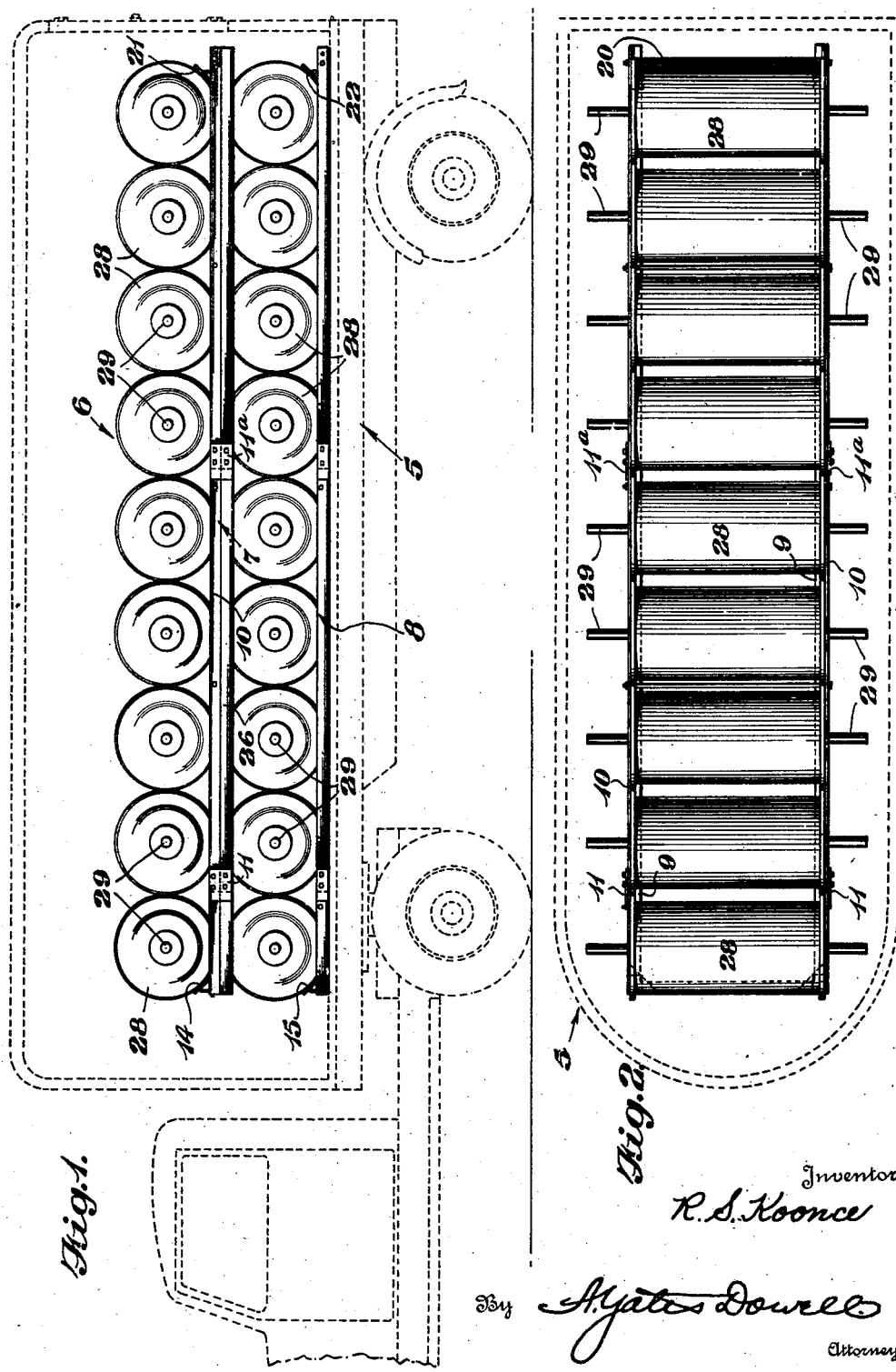

Patented Jan. 17, 1939

2,144,600

UNITED STATES PATENT OFFICE 2,144,600

METHOD OF AND APPARATUS FOR LOADING HEAVY SPOOLS

Richard S. Koonce, Raleigh, N. C.

Application November 3, 1938, Serial No. 238,691

10 Claims. (Cl. 214—6)

This invention relates to a method of and apparatus for loading and transporting large spools of thread and similar shaped objects.

The problem which gave rise to the present invention was the transportation of large spools of rayon thread from the manufacturing plant to the looms or mills. The spools under consideration weigh approximately one thousand pounds each, and in loading and transporting the spools considerable difficulty was experienced in arranging and supporting the spools in the truck or car body in a manner such as to avoid shifting and resultant damage during transportation. Obviously, the question of space plays an important part in the problem, and it becomes practically essential to load the spools in rows and in superimposed relation. Despite extreme care and more or less complicated reinforcing and chocking structures used in loading, the losses resulting from shifting of the spools and crushing or bruising of a relatively large quantity of thread ofttimes amounted to considerable, since in the event the thread of a spool is bruised, the latter is returned for rewinding.

The primary object of the present invention therefore is to provide a method of an apparatus for loading relatively large heavy spools and similar shaped objects in a manner such as to avoid shifting and resultant damage to the contents of the spools during transportation. More specifically, the invention is concerned with the loading and transportation of spools of thread, such as rayon thread, and which is susceptible of bruising and damage when the edge of one spool strikes and rides upon the body portion of another spool.

Another object is to provide means whereby a plurality of relatively large and heavy spool-shaped objects may be loaded in superimposed rows onto a truck or freight car body or other supporting structure expeditiously and with relative ease and transported any desired distance over rough roadways without danger of relative shifting and misalignment of the spools.

The foregoing and other objects and advantages of the invention will become more apparent in view of the following description taken in conjunction with the drawings, wherein:

Fig. 1 is a view in side elevation of a series of spools loaded on a truck body in accordance with the features of the present invention, the truck being illustrated in dotted lines;

Fig. 2 is a top plan view of the loaded spools of Fig. 1;

Fig. 3 is a broken plan view of either the upper or lower loading rack used in loading the spools;

Fig. 4 is a longitudinal section taken through the upper loading rack;

Fig. 5 is a similar view taken through the lower loading rack; and

Fig. 6 is a vertical section between the rolls of Fig. 1.

In the present instance, the vehicle used in transporting the spools is a truck, the body of which is generally indicated at 5. The spools, indicated at 6, are loaded in rows with the spools of the upper row in substantially vertical alignment or directly superimposed upon the spools of the bottom row, as clearly shown in Fig. 1. Since each spool of rayon weighs approximately one thousand pounds, the load plus the weight of the frame is over 19,000 pounds, there being nine spools in the bottom row and nine in the top row.

In carrying out the present method, the spools are loaded on racks or frames which are in general of similar construction with certain variations to render the upper rack applicable to both rows of spools.

Fig. 3 serves as a plan view for either the lower or base rack or the upper rack. As will be noted by observing this figure, each rack comprises side rails, generally indicated at 7, 7a (upper frame) and 8, 8a (lower frame), which are of angle shape in cross section, thereby providing spaced longitudinal spool tracks each having a base flange 9 on which the ends of the spools roll and rest, and side flanges or guards 10, which retain the said ends against lateral shifting movement. As illustrated, the side rails 7, 7a and 8, 8a are made up of a plurality of sections connected by plates 11, 11a, disposed on the outside of the retaining or guard flanges 10 so as to avoid interference with the spool ends. The rails at the front end of each frame are rigidly connected by end cross member 12 reinforced by gusset plates 13, the cross connector 12 preferably being of channel-shape in cross section providing an upright flange 12a.

The front end of each frame is provided with chocks, indicated at 14 on the upper frame and 15 on the lower frame, which are anchored to the end cross members 12 by means of angle pieces 16 and 17.

The tracks or rails 7, 7a; 8, 8a are connected by cross rods 18, 19 and 20, these rods being removed prior to loading the spools. At the rear of each frame are chocks 21 and 22, said chocks being adjustable and accordingly are anchored to cross members 23 and 24 which are slidably mounted on the base flanges 9 of the tracks and are secured in adjusted position through the medium of the rods 20 which at their opposite ends project through holes 25 and 25a formed in registration through the opposed rearwardly turned flanged ends of the sliding cross members 24 and the adjacent portions of the tracks. The chocks 21 and 22 may be advanced or retracted by removing the rods 20 and resetting the latter after the chocks have been adjusted to the desired position.

The upper frame comprising the side tracks or rails 7 and 7a differs from the lower frame in that the said side rails are provided with side flanges 26 complementary to the flanges 10, thereby providing guards or retaining flanges over the upper portions of the lower row of spools. End flanges 27 connect the downwardly projecting guard flanges 26.

The parts of the frames are detachably connected so that they may be readily taken apart and put to one side or compactly stored when not in use.

Each spool is formed with end flanges 28 and a spindle 29, this construction being conventional with spools of the type under consideration. With prior methods of loading, the spools would ofttimes become displaced or shift out of position, causing the end flanges of one spool to strike and ride upon the body portion of another spool having thread or yarn wound thereon, with the result that the thread would be bruised or broken and the spool rejected.

In loading the spools, the lower or base frame or rack comprising the tracks 8 and 8a is first laid on the body of the truck or car with the cross rods and rear chock unit removed. The spools are then rolled on the track in a row as indicated in Fig. 1 and the rear chocks 22 moved up against the rear spool. The upper frame including the side rails or tracks 7 and 7a is then placed in position over the bottom row of spools and the upper row of spools then rolled onto the upper frame, the chocks 21 adjusted against the rear spool and the frame rigidly connected by the cross rods 18, 19 and 20. Once the frames are in position and the chocks secured, the individual spools as well as the rows of spools are held rigidly against any tendency toward lateral and endwise displacement with respect to the frames. By arranging the spools with their axes in substantially vertical alignment, there is less strain on the frames and hence the latter can be made of lighter material. Also, by loading the spools in this manner, the tremendous weight of one row is transmitted directly to the spools of the lower row and thence to the support or base on which the spools rest.

When the spools are loaded on the tracks, the latter may be clamped against the ends of the spools under practically any desired tension. In this manner, not only the spools are retained against shifting but the upper tracks and spools thereon are held against displacement with respect to the lower tracks and spools. If desired, clamping rods may be inserted through the downwardly projecting flanges of the upper track instead of, or in addition, to the rods passed through the upwardly projecting flanges of said tracks, so that the upper tracks may be positively held against spreading movement during loading of the upper row of spools.

While it is obvious that the tracks could be made in one piece lengths instead of in sections, yet by making the tracks in sections, the latter can be knocked down and stored in a more compact arrangement than where the tracks are made in one piece lengths. By making the front end section of each track as an integral unit, the forward end of the track is more rigidly braced.

Actual experience has demonstrated the ability of the improved method and apparatus to maintain the spools in proper loading position over any hauling distance and over all kinds of roads. The loading frames may be manufactured at a relatively low cost and may be quickly and easily assembled. With this type of loading apparatus, also, the loading operation is facilitated and rendered easier.

A distinct feature of advantage resides in the fact that the frames are of the knock-down type, so that after the loaded spools have reached their destination and have been unloaded, the frames may be easily taken apart and disposed in a compact manner in the truck body to make room for returning a large number of empty spools or for loading the truck in any other desired manner.

It will be understood that certain changes in structure and design may be adopted without departing from the spirit or scope of the invention as defined by the appended claims.

What is claimed as new is:

1. The method of loading heavy spools of thread and the like which consists in first laying a track on the truck or car body to be used in transporting the spools, disposing a plurality of spools in a row on the tracks with the sides of the tracks locking the opposite ends of the spools against lateral shifting movement, laying another track over the upper edge portions of the lower row of spools with the latter holding the track against lateral displacement, disposing another row of spools on the said latter track with their axes in substantial vertical alignment with those of the lower row of spools and with the upper track locking the upper spools against lateral displacement, and chocking the rows of spools against rolling movement on said tracks.

2. The method of loading heavy flanged spools of thread on a truck or car body which consists in disposing the spools in a plurality of superimposed rows on frames having vertically flanged tracks with the vertical flanges of the tracks interlocked with the flanges of the spools to hold the spools against lateral displacement on the tracks and chocking the spools against rolling movement on the tracks.

3. Apparatus for loading heavy spool-shaped objects comprising a base track having flanges engaging the side faces of opposite end flanges of one row of spools and another track overlying the first row of spools and also provided with flanges engaging the side faces of opposite end flanges of the first row of spools and the faces of the end flanges of another superimposed row of spools, and means for retaining said spools against rolling movement on said tracks.

4. Apparatus for loading heavy spools of thread and the like comprising in combination with superimposed rows of spools, a base track having flanges closely engaging the opposite flanged ends of the spools of one row, means for chocking said spools against rolling movement on said base track, and a track located above the lower track between adjacent rows of spools and provided with upwardly and downwardly projected flanges engaging the opposite flanged ends of the spools of both the upper and lower rows of spools, and means for chocking the upper row of spools against rolling movement on the upper track.

5. Apparatus for loading heavy spools with flanged ends comprising in combination with lower and upper superimposed rows of spools, a base track having side rails of angle shape in cross section with one of the flanges of the angle forming a base on which the opposite flanged ends of the spools roll and rest and the other flange of the angle closely engaging the spool ends to prevent lateral displacement of the spools, chocks on said track for holding the spools against rolling movement on the track, and another track positioned over the lower row of spools and having tracks of substantially T-shaped cross sections providing upwardly and downwardly projecting side flanges and an intermediate track flange, the laterally projecting flange being interposed between the flanges of the spools of adjacent rows and the upwardly and downwardly projecting flange closely engaging the opposite ends of the spools of adjacent rows to prevent lateral displacement of the upper track and spools thereon, and chocks on said upper track preventing rolling movement of the spools thereon.

6. Apparatus for loading heavy spools of thread and similar shaped objects comprising in combination with upper and lower rows of spools, lower and upper retaining frames including tracks, the tracks of the lower frame forming a base on which the spools roll and come to rest and the tracks of the upper frame being disposed over the flanged edges of the lower row of spools and receiving the flanged edges of the upper row of spools, and means on said tracks positively holding said spools against lateral and endwise displacement.

7. Apparatus for loading heavy spools of thread and the like comprising in combination with a plurality of superimposed lower and upper rows of spools, a pair of frames, one of said frames constituting a base frame and being made up of longitudinal tracks of angle shape in cross section, each track providing a base flange and an upwardly projecting side flange, the base flange forming a track on which the spools of the lower row roll and come to rest and the upwardly projecting flange closely engaging the outer ends of the spools and holding the latter against lateral shifting movement on the tracks, the other frame being interposed between the upper and lower rows of spools and having tracks of T-shape in cross section providing a central flange which is interposed between te flanged ends of adjacent rows of spools and side flanges which closely engage the outer ends of the spools of adjacent rows, and chocks at the front and rear of said frames for holding the rows of spools against endwise displacement.

8. Apparatus for loading heavy spools of thread and the like comprising in combination with a plurality of superimposed lower and upper rows of spools, lower and upper retaining frames including tracks, the tracks of the lower frame providing a base on which the spools roll and come to rest and the tracks of the upper frame being disposed over the flanged edges of the lower row of spools and receiving the flanged edges of the upper row of spools, and means on said tracks for positively holding said spools against lateral displacement, chock means on said tracks holding said spools against rolling movement on the tracks, said frames and tracks being of knockdown construction whereby the apparatus may be dismantled when unloaded and compactly arranged.

9. Apparatus for loading heavy spools of thread and the like comprising in combination a plurality of superimposed lower and upper rows of spools, lower and upper retaining frames including tracks, the tracks of the lower frame providing a base on which the spools roll and come to rest and the tracks of the upper frame being disposed over the flanged edges of the lower row of spools and receiving the flanged edges of the upper row of spools, means for clamping said rails tightly against the opposite ends of the spools after the latter are loaded on the tracks, and means for chocking said spools against rolling movement on said tracks.

10. Apparatus for loading heavy spools of thread and the like comprising in combination with a plurality of superimposed lower and upper rows of spools, lower and upper retaining frames including tracks formed with flanges arranged to interlock with the flanged end edges of the spools, the tracks of the lower frame providing a base on which the spools roll and come to rest and the tracks of the upper frame having their flanges disposed over the flanged edges of the lower row of spools and receiving the flanged edges of the upper row of spools, means for retaining said spools against rolling movement on said track including chocks at the rear end of the tracks, and means for adjusting said chocks with respect to the spools.

RICHARD S. KOONCE.